United States Patent [19]
Pietzsch et al.

[11] 4,098,365
[45] Jul. 4, 1978

[54] DEVICE FOR THE MEASUREMENT OF WHEEL OR AXLE LOADS OF ROAD VEHICLES

[75] Inventors: Ludwig Pietzsch, Rittnerstr. 36, 7500 Karlsruhe 41; Knut Overlach, Karlsruhe, both of Germany

[73] Assignee: Ludwig Pietzsch, Karlsruhe, Germany

[21] Appl. No.: 723,614

[22] Filed: Sep. 15, 1976

[30] Foreign Application Priority Data
Apr. 8, 1976 [DE] Fed. Rep. of Germany ....... 2615289
Apr. 9, 1976 [DE] Fed. Rep. of Germany ....... 2615516

[51] Int. Cl.² .......................................... G01G 19/02
[52] U.S. Cl. ............................... 177/211; 73/141 A; 177/134
[58] Field of Search ...................... 177/211, 133, 134; 73/141 A

[56] References Cited

U.S. PATENT DOCUMENTS

| | | | |
|---|---|---|---|
| 3,105,564 | 10/1963 | Ormond | 177/211 |
| 3,356,170 | 12/1967 | Cory | 177/211 X |
| 3,593,263 | 7/1971 | Olsen | 177/134 X |

*Primary Examiner*—Joseph W. Hartary
*Attorney, Agent, or Firm*—Montague & Ross

[57] ABSTRACT

A device for measuring the wheel or axle load of a road vehicle comprises a plate supported along its periphery at selected points or by knife edges in a frame. Along two imaginary lines of the plate, spaced apart by a distance greater than the length of a contact zone of a wheel on the plate, there are provided at least two pairs of wire strain gauges. Each pair of wire strain gauges includes a wire strain gauge extending in the direction of displacement of the wheel, i.e. perpendicular to the imaginary lines and a wire strain gauge parallel thereto. The measuring signals of the wire strain gauges is added and a multiplication factor $a$ of about 0.3 is provided between the measuring signals of the two gauges of each pair which are added.

29 Claims, 16 Drawing Figures

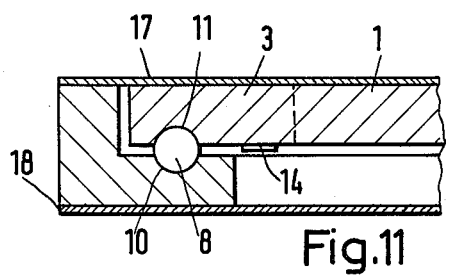
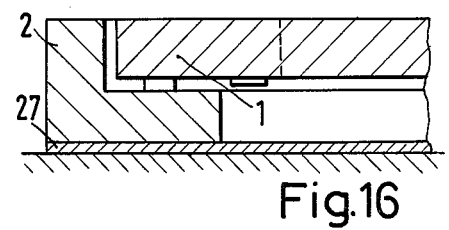
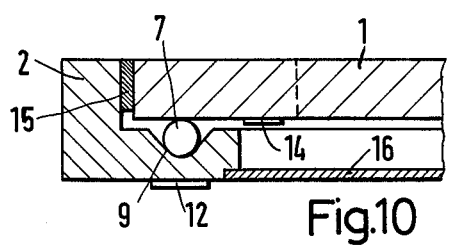
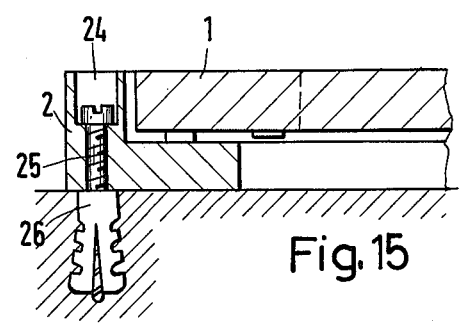
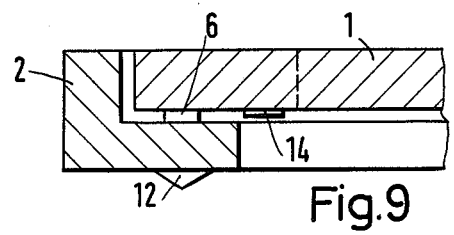
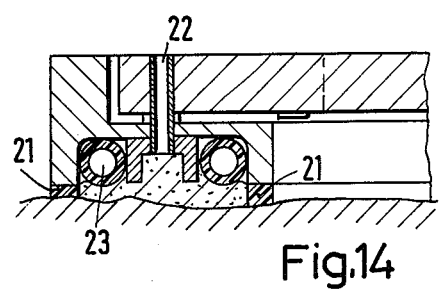
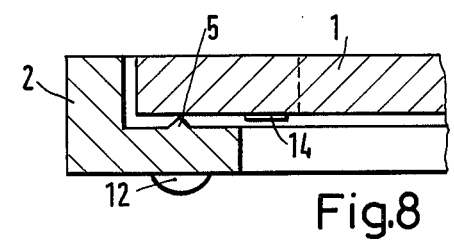
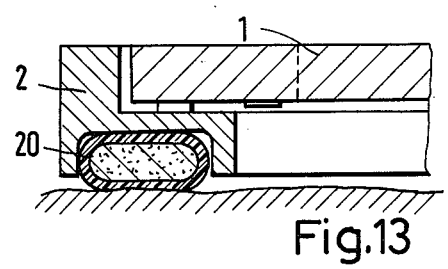
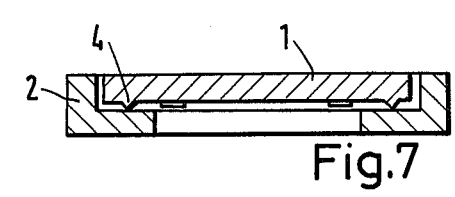
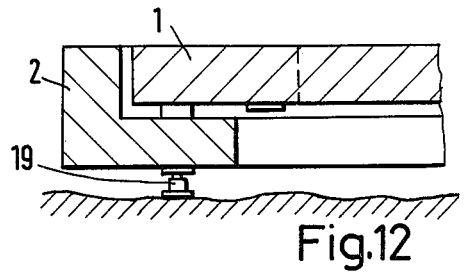

DEVICE FOR THE MEASUREMENT OF WHEEL OR AXLE LOADS OF ROAD VEHICLES

FIELD OF THE INVENTION

The invention concerns a device for the measurement of wheel or axle loads of road vehicles by electrical evaluation of the change of resistance respectively of at least two wire strain gauges, which are fastened to a measuring plate arranged on or in the driving track surface and of which one is mounted with its grid in direction of travel and the other is mounted with its grid displaced through 90° thereto. The strain gauges are connected in a bridge circuit. Devices of this kind are preferably employed for the dynamic axle load measurement.

BACKGROUND OF THE INVENTION

The known devices of the mentioned kind (DT-OS 19 52 355, DT-OS 22 63 145) have a flat mode of construction and possibility of simple installation in stationary as well as mobile application.

OBJECT OF THE INVENTION

The invention has as its object the improvement of the known devices of the mentioned kind in such manner that the transverse bending of the measuring plate is fully recognized and that an unobjectionable support of the measuring plate is always assured so that no inaccuracies of measurement can arise due to unevennesses of the street surface.

SUMMARY OF THE INVENTION

The object is attained in that the two strain gauges are so connected that their measuring signals are added although the measuring signals differ by a certain factor through appropriate choice of the applied voltage, the resistances or the like.

Expediently, two pairs of wire strain gauges always lie opposite one another in such a manner that the spacing of the one pair of the wire strain gauges from the other pair of the wire strain gauges is at least as great as the greatest possible length of the contact area of a wheel.

To assure that the spacing of the wire strain gauges from the points of attack of the bending moment is unambiguously determined, according to a further feature of the invention, the measuring plate is supported on sharpedged bearings extending parallel to one another and transversely to the direction of travel and the wire strain gauges are arranged on imaginary straight lines extending parallel to one another and transversely to the direction of travel.

A particularly advantageous connection of the wire strain gauges has each pair of the wire strain gauges connected behind one another in one branch of a bridge. The resistances of these wire strain gauges are so chosen that the resistance of the wire strain gauge, arranged with its grid in direction of travel, corresponds to the resistance, multiplied by the multiplication factor, of the wire strain gauge arranged with its grid displaced through 90° to the direction of travel.

Another connection, according to the invention, of the wire strain gauges is such that the two wire strain gauges of each pair display equally great resistances and are connected in analogous branches of two bridges, wherein any desired voltage is applied to the bridge with the wire strain gauges arranged with its grid in direction of travel, while the voltage, applied to the bridge with the aforementioned wire strain gauges arranged with its grid displaced through 90° to the direction of travel, is multiplied by the factor.

In a further connection according to the invention, the two wire strain gauges of each pair display equal resistances and are connected in analogous branches of two bridges, to which the same voltage is applied, while an adjustable resistance is so connected that the measuring signal of the wire strain gauges, arranged with their grids displaced through 90° to the direction of travel, is conducted therethrough.

To make possible a better evaluation of the measuring signals, in further development of the invention, at least one amplifier is so connected in each bridge that the measuring signals are conducted therethrough.

It has shown itself that the transverse bending of the measuring plate is to be picked up most simply when the factor has about the value 0.3.

In order that the point in time of the start of an integration process or the averaging of the measuring values can be determined exactly, according to a further feature of the invention, the respectively opposite pairs or groups of pairs of the wire strain gauges are connected - as individual bridge branch or each augmented to a half bridge or a full bridge - with conductors, which are led out of the measuring plate and connected to an electrical switching system.

A substantial improvement of the device according to the invention is attained by arranging the measuring plate in a frame and providing it with projections, the outer ends of which are connected in the frame, at its two edges extending transversely to the direction of travel. The wire strain gauges are connected in the region of the projections, namely on an imaginary line underneath the projections. Due to the gaps between the projections, the measuring plate is less stiff in bending transversely to the direction of travel, so that — on loading of the device — each projection rests on the frame before it bends in direction of travel. Beyond that, the introduction of the supporting forces ensues at defined locations. Thereby, accurate measuring values always result.

Expediently, the projections are constructed in the shape of a trapezium in such a manner that the narrow side of the trapezium is directed outwardly.

In advantageous development of the invention, the support of the outer ends of the projections in the frame is effected by a knife edge support formed by projecting edges, the knife edge extending transversely to the direction of travel. Thus the points of attack of the bending moment are unambiguously determined.

According to a further feature of the invention, cylindrical stays are arranged between the ends of the projections and the frame, so that the support is point-shaped.

A point-shaped support of the projections of the measuring plate can also be attained by providing the frame in the region of the projections at its side facing the measuring plate with spherical segments supporting the measuring plate is supported by way of balls on the frame.

According to a further feature of the invention the ends of the projections are provided with spherical segments at their side facing the frame. Thus a displacement of the measuring plate within the frame is prevented.

To enable transverse bending of the measuring plate to be compensated by the measurement technique, at least two wire strain gauges each are arranged directly beside one another, of which one is mounted with its grid in direction of travel and one is displaced through 90° thereto.

For the protection of the device against the ingress of moisture and dirt, in further development of the invention, the lateral gaps between the measuring plate and the frame are filled out by an elastic filler mass or the surface of the device is covered with a film of elastic material. Furthermore, the surface of the frame facing the foundation is covered by a thin plate or film. The respective groups of wire strain gauges can however also be covered individually.

In order that in spite of possible coarse unevennesses of the foundation, the support edge for the projections is as planar as possible to assure a uniform loading of all projections, the frame — in a form of construction of the device according to the invention — is so constructed that its support on the foundation is point-shaped by reason of protrusions, the protrusions of the frame being arranged in the region underneath the projecting edges or the cylindrical stays or the balls. According to a further feature of the invention, the protrusions of the frame are each arranged in the region underneath the gap between the projections.

An unobjectionable support of the device can also be attained by mounting hydraulic or pneumatic lifting cylinders at the surface of the frame facing the foundation; elastic hollow bodies filled with a powdery or liquid and/or self-hardening material can alternately be mounted at the surface of the frame facing the foundation; in still another alternative the frame at its surface facing the foundation is provided with an encircling sealing profile of elastic material and at least one each of a water-conducting and a liquid-gas-conducting duct, which is disposed in communication with corresponding supply containers, open out into the surface of the frame facing the foundation. The lifting cylinders form adjustable individual supports of the frame. In place of the lifting cylinders, mechanical elements can also be employed; these can include, for example, threaded spigots threadable into the frame.

A relatively slip-fast support of the device is attained according to the invention by providing the surface of the frame facing the foundation with a plate of a material, for example rubber, with a high co-efficient of friction.

A direct connection of the device with the foundation is effected by providing the frame with passage holes for screws, which are threaded into dowels mounted in the foundation. Thus the device remains undisplaceable in its location even when a vehicle sharply brakes on the device.

Further features of the invention for the bringing about of a secure support of the device on the foundation consist in that the surface of the frame facing the foundation is coated with bitumen, which can be applied in hot state immediately before the placing of the frame on to the foundation, in that the surface of the frame facing the foundation is coated with a mortar, which is produced from plaster of Paris or cement or the like, or is painted with an adhesive substance, wherein the mortar or the adhesive substance, respectively, can be applied immediately before the placing of the frame on to the foundation.

BRIEF DESCRIPTION OF THE DRAWING

The device according to the invention is more explained in greater detail with reference to the drawing. In the drawing:

FIG. 7 is a section along the line VII—VII in FIG. 6; and

FIGS. 8 to 16 each show the upper part of a section of further devices, corresponding to the section along the line VII—VII in FIG. 6, to an enlarged scale.

SPECIFIC DESCRIPTION

Figure 1:
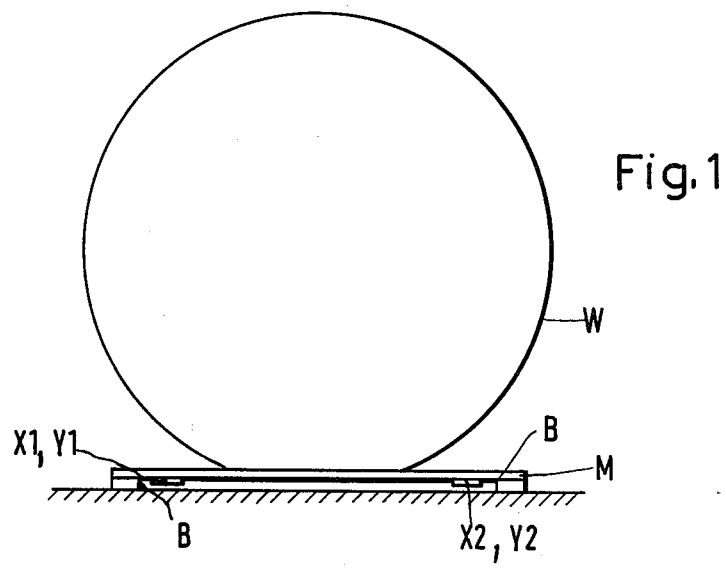
FIG. 1 is a diagrammatic side elevation showing a measuring plate with wheel disposed thereon.
Figure 2:
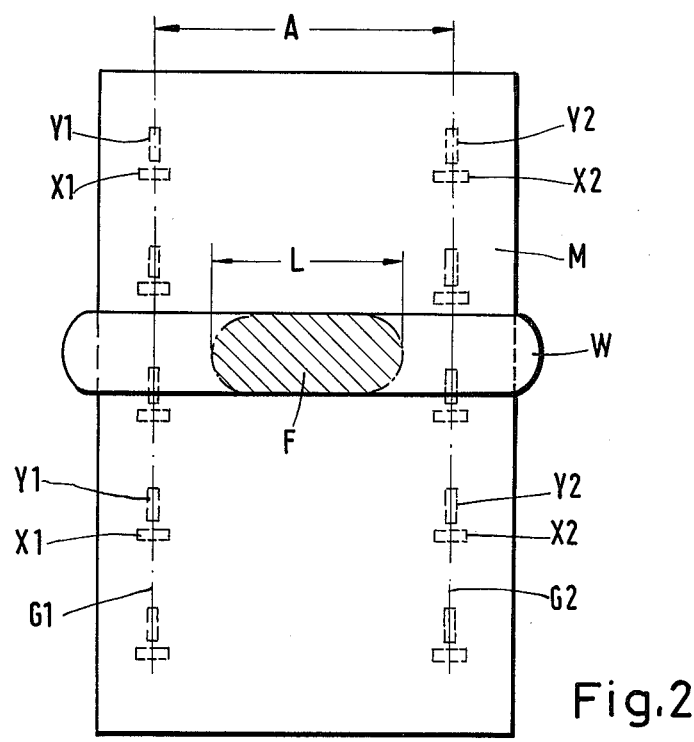
FIG. 2 is a plan view of the measuring plate according to FIG. 1.

The measuring plate M illustrated in the FIGS. 1 and 2 is supported on sharp-edged bearings B and is provided at its underside with wire strain gauges $x1$, $y1$, $x2$ and $y2$, which are each arranged in pairs on an imaginary straight line G1 or G2. The wheel W disposed on the measuring plate M has a contact surface F, the outline of which is indicated by a dot-dashed line and which for the sake of clarity is hatched. The spacing A of the notional straight lines G1 and G2 from one another is greater than the length L of the contact area F.

Figure 3:
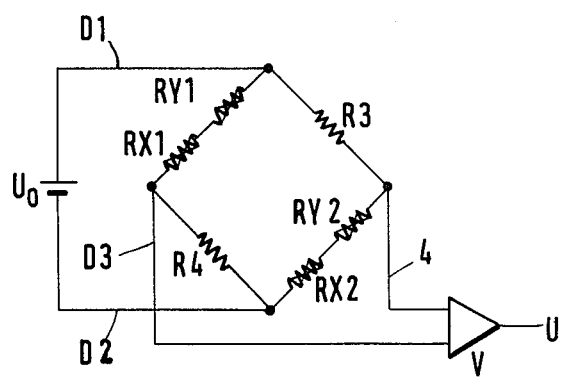
FIG. 3 is a circuit diagram with only one bridge.

Illustrated in FIG. 3 is a bridge circuit, in which the wire strain gauge, with its grid arranged in direction of travel and with the resistance $R_{x1}$, and the wire strain gauge, arranged displaced thereto through 90° and with the resistance $R_{y1}$, are connected behind one another in one branch of the bridge. The wire strain gauges, respectively lying opposite to the aforementioned wire strain gauges within the device and with the resistances $R_{x2}$ and $R_{y2}$, are likewise connected behind one another in the diametrally opposite branch of the bridge. Fixed resistances $R_3$ and $R_4$ or adjustable resistances are provided in the two other branches of the bridge. The resistances of the wire strain gauges stand in the following relation to one another:

$$R_{x1} = a \cdot R_{y1} \qquad R_{x2} = a \cdot R_{y2}$$

In this case, $a$ is a certain factor which is independent of the dimensions and the bearing conditions of the device.

A voltage $U_o$ is applied to the bridge through the lines 1 and 2. The measuring signal resulting on loading of the device by a vehicle is conducted by means of lines 3 and 4 by way of an amplifier V; the amplified output signal U is a measure of the wheel or axle loading of the vehicle.

By the designation $R_{x1}$, $R_{x2}$, $R_{y1}$ and $R_{y2}$ can be meant the resistances of individual wire strain gauges, but however also the sums of all resistances of the wire strain gauges concerned. This applies also to the examples of embodiment described hereinafter.

Figure 4:
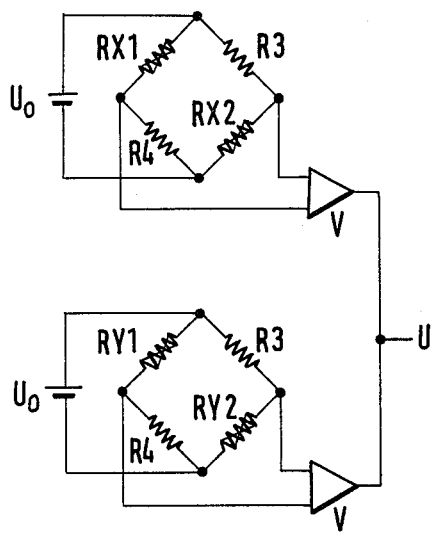
FIG. 4 is a circuit diagram with two bridges to which different voltages are applied.

In the case of the bridge circuit according to FIG. 4, the wire strain gauges lying opposite each other in the device with their grid arranged in direction of travel and with the resistances $R_{x1}$ and $R_{x2}$ are respectively connected in diametrally opposite branches of a bridge, while the wire strain gauges likewise lying opposite in the device with their grid arranged displaced through 90° to the direction of travel and with the resistances $R_{y1}$ and $R_{y2}$ are respectively connected into diametrically opposite branches of a second bridge. Fixed resistances $R_3$ and $R_4$ or adjustable resistances are respectively provided in both other arms of each bridge. In this case, the resistances $R_{x1}$, $R_{x2}$, $R_{y1}$ and $R_{y2}$ are equally great. Instead thereof, different voltages are applied to the two bridges, namely the voltage $U_o$ to the bridge with the resistances $R_{x1}$ and $R_{x2}$ and the voltage $a \cdot U_o$ to the bridge with the resistances $R_{y1}$ and $R_{y2}$. In this case, the factor $a$ has the same value as the factor $a$, by which the resistances of the bridge circuit according to FIG. 3 differ. The measuring signals resulting on loading of the device are conducted through amplifiers V also in the case of this example of embodiment. Thereafter, the amplified measuring signals are added and thus yield a measure for the wheel or axle loading of the vehicle.

Figure 5:
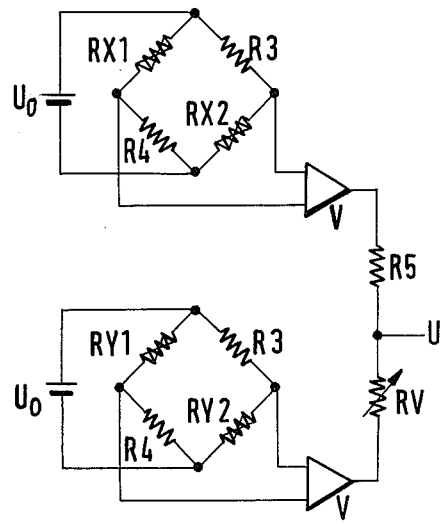
FIG. 5 is another circuit diagram with two bridges to each of which the same voltage is applied.

The bridge circuit illustrated in FIG. 5 corresponds in its construction substantially to the bridge circuit according to FIG. 4. The resistances $R_{x1}$, $R_{x2}$, $R_{y1}$ and $R_{y2}$ are equal as in the embodiment according to FIG. 4; however, the same voltage $U_o$ is applied to each of the two bridges. A difference relative to the embodiment according to FIG. 4 is that the amplified measuring signals coming out from the amplifiers V are conducted through resistances before their addition, the measuring signal of the bridge with the resistances $R_{x1}$ and $R_{x2}$ namely being conducted through a fixed resistance $R_5$ and the measuring signal of the bridge with the resistances $R_{y1}$ and $R_{y2}$ through an adjustable resistance $R_v$. The resistance $R_v$ is so adjusted that the following relation exists between this and the fixed resistance $R_5$:

$$R_5 = a \cdot R_v$$

The measuring signals coming from the resistances $R_5$ and $R_v$ are added and thus yield a measure for the axle or wheel loading of the vehicle.

Figure 6:
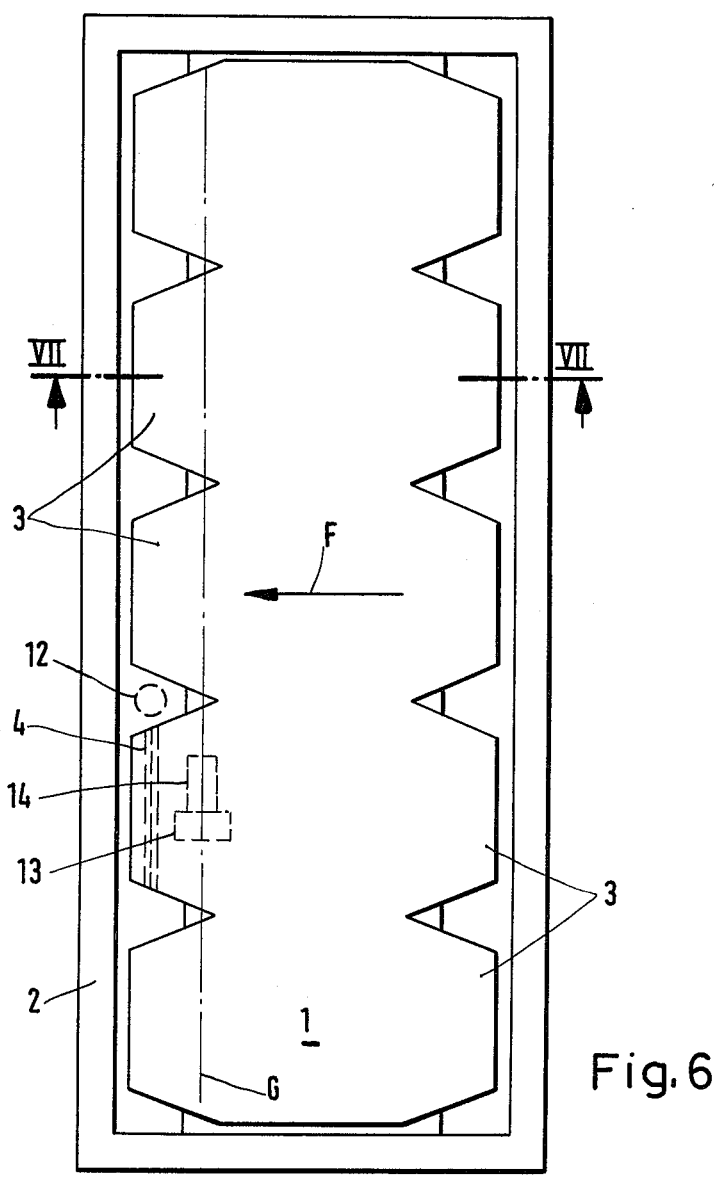
FIG. 6 is a plan view of a measuring plate arranged in a frame.

The device illustrated in FIG. 6, which is traversed by the vehicles in the direction of travel F, consists of a measuring plate 1 which is arranged in a frame 2. The measuring plate 1 is provided with projections 3 which are constructed in the shape of a trapezium, wherein the narrow side of the trapezium is directed outwardly. The measuring plate 1 is supported by the projections 3 on the frame 1. This support is effected either by a knife edge support (FIGS. 7 and 8) or in point-shape (FIGS. 9 to 11).

In the case of the example of embodiment according to FIG. 7, the knife edge support is formed by a projecting edge 4 at the measuring plate, while in the case of the example of embodiment according to FIG. 8, the knife edge support is formed by a projecting edge 5 at the frame 2.

In the FIGS. 9 to 11, examples are illustrated for a point-shaped support of the measuring plate 1. This point-shaped support can ensue by way of cylindrical stays 6 (FIG. 9), which are arranged between the ends of the projections 3 and the frame 2, or by balls 7 or 8 (FIGS. 10 and 11). In that case, the balls 7 and 8 rest in spherical segments 9 and 10 of the frame 2. However, the measuring plate 1 can also be provided with spherical segments 11 (FIG. 11).

For the point-shaped support of the frame 2 on the foundation, protrusions 12, which can be constructed to be spherical (FIG. 8), conical (FIG. 9) or cylindrical (FIG. 10), are provided at the surface of the frame 2 facing the foundation. The protrusions 12 are each arranged in the region underneath the gap between the projections 3.

Wire strain gauges 13 and 14 are mounted directly beside one another in respective pairs at the underside of each projection 3 (FIG. 6), namely in such a manner that one of the wire strain gauges 13 is mounted with its grid in direction of travel F and the other wire strain gauge 14 displaced through 90° thereto. The wire strain gauges 13 and 14 are disposed on an imaginary straight line G.

The lateral gaps between the measuring plate 1 and the frame 2 are filled out with an elastic filler mass 15 and the surface of the frame 2 facing the foundation is covered by a thin plate or a film 16 (FIG. 10). However, the surface of the device can also be covered by a film 17 of elastic material and the surface of the frame 2 facing the foundation can be provided with a plate 18 (FIG. 11). The plate 18 expediently consists of a material of high coefficient of friction, so that the plate 18 secures the device on the one hand against the ingress of moisture and dirt and on the other hand against displacement.

In the case of the example of embodiment according to FIG. 12, hydraulic or pneumatic lifting cylinders 19 are mounted at the surface of the frame 2 facing the foundation, while in the case of the example of embodiment according to FIG. 13, elastic hollow bodies, filled with a powdery or liquid material, are mounted at the surface of the frame 2 facing the foundation. In that case, for example, the material can be a self-hardening synthetic material and the elastic hollow bodies 20 consist of hoses. Both arrangements serve to support the device evenly. In the case of the example of the embodiment according to FIG. 13, this occurs in the manner that the powdery or liquid material so distributes itself under the pressure of the weight of the measuring plate that the elastic hollow bodies 20 accurately adapt themselves to the foundation as well as also to the lower surface of the measuring plate 1.

Illustrated in FIG. 14 is a device according to the invention, in which the frame 2 is provided at its surface facing the foundation with an encircling sealing profile 21 of elastic material. Ducts 22 and 23 open out into the surface of the frame 2 facing the foundation. The ducts 22 conduct water and the ducts 23 conduct a liquid gas. The water, which flows into the space formed by the foundation, the surface of the frame 2 facing the foundation and the sealing profile 21, freezes on contact with the entering liquid gas so that the device obtains an accurately adapted and rigidified support. Moreover, the device is firmly connected with the foundation after the freezing of the water. Since the ducts 22 and 23 are disposed in communication with corresponding, not illustrated supply containers, a thawing out of the water is not possible.

A firm connection of the device with the foundation can according to FIG. 15 also be attained thereby, that the frame 2 is provided with passage holes 24 for screws 25, which are threaded into dowels 26, which are mounted in the foundation.

Furthermore, a firm connection of the device with the foundation can according to FIG. 16 be attained thereby, that the surface of the frame 2 facing the foundation is coated with bitumen 27, which was applied in hot state immediately before the setting of the frame 2 on to the foundation. In place of bitumen, a mortar, produced from plaster of Paris or cement or the like, or an adhesive substance can also be used.

We claim:

1. In a device for the measurement of wheel or axle loads of road vehicles by electrical evaluation of the change of resistance respectively of at least two wire strain gauges, which are fastened to a measuring support arranged on or in the driving track surface and of which one is mounted with its grid in direction of travel and the other displaced through 90° thereto, by means of a bridge circuit, the improvement wherein two pairs of such wire strain gauges are mounted along at least two imaginary lines of a plate constituting said support and in turn supported outwardly of said lines, and the two strain gauges of each pair are so connected that their measuring signals which are selected to differ by a multiplication factor $a$ are added.

2. The improvement defined in claim 1 wherein the two pairs of wire strain gauges always lie opposite one another in such a manner that the spacing A of the one pair of the wire strain gauges from the other pair of the wire strain gauges is at least as great as the greatest possible length of the contact area with the plate of a wheel.

3. The improvement defined in claim 2 wherein the measuring plate is supported on sharp-edged bearings extending parallel to one another and transversely to the direction of travel and that the wire strain gauges are arranged on imaginary straight lines extending parallel to one another and transversely to the direction of travel.

4. The improvement defined in claim 3 wherein each pair of the wire strain gauges is connected behind one another in one branch of a bridge and the resistances of these wire strain gauges are so chosen that the resistance of the wire strain gauge, arranged with its grid in direction of travel, corresponds to the resistance multiplied by the factor $a$, of the wire strain gauge arranged with its grid displaced through 90° to the direction of travel.

5. The improvement defined in claim 3 wherein the two wire strain gauges of each pair have equal resistances and are connected in analogous branches of two bridges, wherein any desired voltage is applied to the bridge with the wire strain gauges arranged with its grid in direction of travel, while the voltage, applied to the bridge with the wire strain gauges arranged with its grid displaced through 90° to the direction of travel is said desired voltage multiplied by the factor $a$.

6. The improvement defined in claim 3 wherein the two wire strain gauges of each pair have resistances and are connected in analogous branches of two bridges, to which the same voltage is applied, and that an adjustable resistance is so connected that the measuring signal of the wire strain gauges, arranged with their grids displaced through 90° to the direction of travel, is conducted therethrough.

7. The improvement defined in claim 3 wherein, at least one amplifier is connected in each bridge that the measuring signals are conducted through.

8. The improvement defined in claim 3 wherein the factor $a$ has about the value 0.3.

9. The improvement defined in claim 3 wherein the respectively opposite pairs or groups of pairs of the wire strain gauges are connected — as individual bridge branch or each augmented to a half bridge or a full bridge — with conductors, which are led out of the measuring plate and connected to an electrical switching system.

10. The improvement defined in claim 3 wherein the measuring plate is arranged in a frame and has projections, the outer ends of which are supported in the frame, at its two edges extending transversely to the direction of travel, and the wire strain gauges are arranged in the region of the projections, namely on an imaginary line underneath the projections.

11. The improvement defined in claim 10 wherein the projections are constructed in the shape of a trapezium in such a manner that the narrow side of the trapezium is directed outwardly.

12. The improvement defined in claim 10 wherein the support of the outer ends of the projections in the frame is effected by a knife edge support formed by projecting edges, wherein the knife edge extends transversely to the direction of travel.

13. The improvement defined in claim 10 wherein cylindrical stays are arranged between the ends of the projections and the frame.

14. The improvement defined in claim 10 wherein the frame in the region of the projections at its side facing the measuring plate is provided with spherical segments and the measuring plate is supported by way of balls on the frame.

15. The improvement defined in claim 14 wherein the ends of the projections are provided with spherical segments at their side facing the frame.

16. The improvement defined in claim 10 wherein the lateral gaps between the measuring plate and the frame are filled out by an elastic filler mass.

17. The improvement defined in claim 10 wherein the surface thereof is covered with a film of elastic material.

18. The improvement defined in claim 10 wherein the surface of the frame, facing the foundation, is covered by a thin plate or film.

19. The improvement defined in claim 10 wherein the frame is so constructed that its support on the foundation ensues in point-shape by way of protrusions.

20. The improvement defined in claim 9 wherein the protrusions of the frame are arranged in the region underneath the projecting edges or cylindrical stays or balls.

21. The improvement defined in claim 20 wherein the protrusions of the frame are each arranged in the region underneath the gap between the projections.

22. The improvement defined in claim 10 wherein hydraulic or pneumatic lifting cylinders are mounted at the surface of the frame facing the foundation.

23. The improvement defined in claim 10 wherein elastic hollow bodies filled with a powdery or liquid and/or self-hardening material, are mounted at the surface of the frame facing the foundation.

24. The improvement defined in claim 10 wherein the frame at its surface facing the foundation is provided with an encircling sealing profile of elastic material, and that at least one each of a water-conducting and a liquid-gas-conducting duct, which are disposed in communication with corresponding supply containers, open out into the surface of the frame facing the foundation.

25. The improvement defined in claim 10 wherein the surface of the frame facing the foundation is provided with a plate of a material, for example rubber, with a high co-efficient of friction.

26. The improvement defined in claim 10 wherein the frame is provided with passage holes for screws, which are threaded into dowels mounted in the foundation.

27. The improvement defined in claim 10 wherein the surface of the frame facing the foundation is coated with bitumen applied in hot state immediately before the placing of the frame on to the foundation.

28. The improvement defined in claim 10 wherein the surface of the frame facing the foundation is coated with a mortar produced from plaster of Paris or cement or the like and freshly applied immediately before the placing of the frame on to the foundation.

29. The improvement defined in claim 10 wherein the surface of the frame facing the foundation is painted with an adhesive substance, which was applied immediately before the placing of the frame on to the foundation.

* * * * *